United States Patent [19]

Gersho et al.

[11] Patent Number: 5,303,330
[45] Date of Patent: Apr. 12, 1994

[54] HYBRID MULTI-LAYER NEURAL NETWORKS

[75] Inventors: Marvin H. Gersho, Plainfield; Randall R. Reiter, Upper Saddle River, both of N.J.

[73] Assignee: Bell Communications Research, Inc., Livingston, N.J.

[21] Appl. No.: 992,868

[22] Filed: Dec. 17, 1992

Related U.S. Application Data

[63] Continuation of Ser. No. 709,652, Jun. 3, 1991, abandoned.

[51] Int. Cl.$^5$ .............................................. G06F 15/18
[52] U.S. Cl. ......................................... 395/24; 395/11
[58] Field of Search ........................... 395/11, 22, 24

[56] References Cited

U.S. PATENT DOCUMENTS

| | | | |
|---|---|---|---|
| 5,060,278 | 10/1991 | Fukumizu | 395/22 |
| 5,065,040 | 11/1991 | Peterson et al. | 395/24 |
| 5,067,095 | 11/1991 | Peterson et al. | 395/24 |

OTHER PUBLICATIONS

Yoshihiro Mori et al., "A Large-Scale Neural Network Which Recognizes Handwritten Kanji Characters", Advances in Neural Information Processing Systems 2, David S. Touretzky, ed, Morgan Kaufmann Publishers, San Mateo, Calif., 1990, pp. 415–421.
Fukushima, K., "Self-Organizing Neural Network Models for Visual Pattern Recognition", ACTA Neurochisurgica, 1987, pp. 51–67.
Lippmann, Richard P., "An Introduction to Computing with Neural Nets", IEEE ASSP Magazine, Apr. 1987, pp. 4–22.
Smith, Terence R., et al., "Calibration of Neural Networks Using Genetic Algorithms, with Application to Optimal Path Planning", First Annual Workshop on Space Operations, Automation, and Robotics (SOAR '87), Aug. 5–7, 1987, pp. 519–526.
Fukushima, Kunibiko, "Neural Network Models for Visual Pattern Recognition", Parallel Processing in Neural Systems and Computers; Elsevier Sci. Publ., 1990, pp. 351–356.
Gersho, Marvin and Reiter, Randy, "Information Retrieval Using Hybrid Multi-layer Neural Networks", IJCNN 1990, pp. II-111–II-117.
Josin, Gary, "Combinations of Neutral Systems for Particular Application Situations", Neural Systems Inc., Vancouver, British Columbia, Canada, pp. IV:5-17-524.

Primary Examiner—Allen R. MacDonald
Attorney, Agent, or Firm—Leonard Charles Suchyta; James W. Falk

[57] ABSTRACT

A hybrid network 100 which combines a neural network of the self-organized type 110 with a plurality of neural networks of the supervised learning type 150,160,170 to successfully retrieve building address information from a database using imperfect textual retrieval keys. Generally, the self-organized type is a Kohonen Feature Map network, whereas each supervised learning type is a Back Propagation network. A user query 105 produces an activation response 111,112,113 from the self-organized network 110 and this response, along with a new query 151,161,171 derived from the original query 105, activates a selected one of the learning networks $R_1, R_2, R_M$ to retrieve the requested information.

14 Claims, 9 Drawing Sheets

THREE NATIONWIDE PLAZA
200 CIVIC CENTER
625 HAMILTON
3110 OLENTANGY RIVER
INTERNATIONAL AIRPORT
LONDON-GROVEPORT
REFUGEE HAMILTON
3180 KINGSDALE CENTER
3165 OLENTANGY
6530 SINGLETREE
41 HIGH MAINTELE
1 NATIONWIDE PLAZA
1939 FOUNTAIN SQ
483 NEILSTON
6401 CENTENNIAL
750 PIEDMONT
500 HAMILTON
386 GEORGE WASHINGTON
0 FAIRGROUNDS J COX
2001 ARLINGATE
3737 ZANE TRACE
TWO NATIONWIDE PLAZA
3165 OLENTANGY RIVER
2540 OLENTANGY RIVER
2711 INTERNATIONAL
3460 ZANE TRACE
2831 HAMILTON
4133 ARLINGATE PLAZA
2400 CORPORATE EXCHANGE
WILSON N/O TWIN CR
NEIL AT GOODALE
521 NELSON
1261 DUBLIN
21 STATE CLMB
4300 KIMBERLEY
930 WILLIAMS
940 WILLIAMS
200 GEORGESVILLE
937 BURRELL
2120 WESTBELT
785 FREBIS
1423 STELZER
3083 SILVER
2551 WESTBELT
1600 DUBLIN
1380 DUBLIN
1393 DUBLIN
2255 KIMBERLEY
1 COLUMBUS SQUARE
COLUMBUS OHIO $W_{ij}$

| | | | | |
|---|---|---|---|---|
| 0.66997 | 0.12934 | 0.28849 | 0.21417 | 0.74719 |
| 0.63883 | 0.26756 | 0.12839 | 0.39718 | 0.33988 |
| 0.09754 | 0.47298 | 0.18118 | 0.62020 | 0.50234 |
| 0.79569 | 0.39776 | 0.08448 | 0.22592 | 0.15165 |
| 0.51919 | 0.46082 | 0.28506 | 0.40443 | 0.43298 |
| 0.28879 | 0.11251 | 0.27360 | 0.11057 | 0.41315 |
| 0.33651 | 0.63002 | 0.16776 | 0.06217 | 0.17633 |
| 0.11655 | 0.37279 | 0.33423 | 0.28743 | 0.57888 |
| 0.46208 | 0.32531 | 0.07911 | 0.13000 | 0.05947 |
| 0.28023 | 0.20703 | 0.51669 | 0.69667 | 0.27322 |
| 0.21777 | 0.34178 | 0.53428 | 0.76965 | 0.17424 |
| 0.11998 | 0.25171 | 0.29206 | 0.13831 | 0.29672 |
| 0.22393 | 0.43293 | 0.57112 | 0.48989 | 0.44524 |
| 0.19108 | 0.17515 | 0.24824 | 0.41951 | 0.56055 |
| 0.23844 | 0.31267 | 0.38089 | 0.25406 | 0.13956 |
| 0.23500 | 0.15334 | 0.35333 | 0.36445 | 0.41844 |
| 0.25340 | 0.13942 | 0.14875 | 0.18773 | 0.34532 |
| 0.43293 | 0.26232 | 0.41803 | 0.49735 | 0.27043 |
| 0.12965 | 0.22361 | 0.11567 | 0.34988 | 0.19021 |
| 0.35068 | 0.72766 | 0.41602 | 0.18911 | 0.46344 |
| 0.35870 | 0.92507 | 0.10850 | 0.07862 | 0.09616 |
| 0.23084 | 0.17672 | 0.26691 | 0.26691 | 0.20518 |
| 0.66510 | 0.19703 | 0.59452 | 0.36717 | 0.15890 |
| 0.38959 | 0.38816 | 0.75988 | 0.18655 | 0.09853 |
| 0.29838 | 0.22265 | 0.18024 | 0.23601 | 0.24631 |
| 0.32042 | 0.46422 | 0.14756 | 0.39031 | 0.28724 |
| 0.14473 | 0.30430 | 0.36049 | 0.57812 | 0.27977 |
| 0.12977 | 0.58764 | 0.24073 | 0.19512 | 0.41126 |
| 0.20659 | 0.50035 | 0.19630 | 0.03509 | |

2790 FISHER  
3349 SOUTH  
3776 HIGH  
330 18TH  
274 FIRST  
2323 5TH  
4600 17TH  
35 CHESTNUT  
320 8TH  
280 HIGH  
4300 5TH  
17 HIGH  
2929 KENNY  
2050 KENNY  
65 STATE  
3651 FISHER  
4343 EQUITY  
34 THIRD  
200 HIGH RM507  
78-80 CHESTNUT  
505 KING  
4393 17TH  
4400 17TH  
793 STATE  
8101 HIGH  
51 HIGH  
4350 EQUITY  
4499 FISHER  
75 STATE  
155 HIGH  
175 THIRD  
225 THIRD  
315 PHILLIPI  
4545 FISHER  
} 34 ORIGINAL ADDRESSES

W2790 FISHER  
Q3349 SOUTH  
23776 HIGH  
R330 18TH  
9274 FIRST  
Z2323 5TH  
V4600 17TH  
D35 CHESTNUT  
G320 8TH  
D280 HIGH  
E4300 5TH  
317 HIGH  
M2929 KENNY  
02050 KENNY  
I65 STATE  
} 15 ERROR ADDRESSES

FIG. 7

| NODE | WEIGHTS (z) |
|---|---|
| BIAS | -1.5127 |
| 1521 | -0.7600 |
| · | -0.0414 |
| · | +0.0087 |
| · | +0.2150 |
|  | +1.4737 |
|  | -2.2454 |
|  | -0.4553 |
|  | -0.1070 |
|  | -0.9438 |
|  | -1.5984 |
|  | +1.9870 |
|  | +0.0201 |
|  | +2.1558 |
|  | -0.0965 |
|  | -0.1515 |
|  | -1.8713 |
|  | -1.2690 |
|  | -0.7978 |
|  | -1.4896 |
|  | -0.9638 |
|  | +0.0739 |
|  | -1.0859 |
|  | -1.3828 |
|  | -1.6293 |
|  | -0.5010 |
|  | -0.5651 |
|  | -1.0318 |
|  | -0.1977 |
|  | -0.5926 |
|  | +0.9214 |
|  | -0.2128 |
|  | -0.5984 |
|  | +1.8965 |
|  | -0.6822 |
|  | -0.3823 |
|  | +0.4780 |
|  | +0.0118 |
|  | +1.2814 |
|  | -1.4943 |
|  | -0.0485 |
|  | -0.7141 |
|  | -1.0101 |
|  | -1.7507 |
|  | +0.3850 |
|  | -0.8860 |
|  | -1.4002 |
|  | -0.9649 |
|  | -2.0947 |
|  | -0.7243 |
| 1524 | +0.6118 |

2790 FSHER
3349 SOUEH
3776HIGH
330 16TH
274 FIAST
223 5TH
460 17TH
35 CHBSTNUT
230 8TH
280 IGH
6300 5TH
17 IGH
2299 KENNY
205 OKENNY
D5 STATE
6351 FISHER
4343 QEUITY
34 TBIRD
200H IGH RM507
78-80 CESTNUT
50 KING
439C3 17TH
4400 17AH
793S TATE
D101 HIGH
51 HGH
4350 EUITY
4499HFISHER
75 TSATE
155 IHGH
175 TIRD
225 HTIRD
315 PHILAIPI
4545Q FISHER

FIG. 9

| NODE | WEIGHTS (z) |
|---|---|
| BIAS | −1.6855 |
| 1521 | −1.4530 |
| · | −0.9052 |
| · | −1.3418 |
| · | −0.8816 |
|  | +1.5413 |
|  | −1.3306 |
|  | +0.2961 |
|  | −0.9645 |
|  | −0.0927 |
|  | −1.0003 |
|  | −0.3808 |
|  | +1.5826 |
|  | +0.9540 |
|  | −0.5201 |
|  | −0.9220 |
|  | −0.9544 |
|  | +0.3321 |
|  | −1.1100 |
|  | −0.6092 |
|  | −1.3105 |
|  | +0.2859 |
|  | −1.0295 |
|  | −1.0185 |
|  | −1.3971 |
|  | +0.5131 |
|  | −0.8179 |
|  | −1.2256 |
|  | −0.5999 |
|  | +0.1647 |
|  | −1.5181 |
|  | −0.2156 |
|  | −1.3940 |
|  | +0.2257 |
|  | −1.0695 |
|  | −0.9912 |
|  | +0.5928 |
|  | +0.3700 |
|  | +1.0809 |
|  | −0.8980 |
|  | −0.1770 |
|  | −1.7782 |
|  | −1.0686 |
|  | +0.3442 |
|  | −0.8204 |
|  | −0.7393 |
|  | −0.1257 |
|  | −1.0169 |
|  | −1.1307 |
|  | +0.8054 |
| 1524 | +1.4014 |

$r_{11}$ 1531

HYBRID MULTI-LAYER NEURAL NETWORKS

This is a continuation of application Ser. No. 07/709,652, filed Jun. 3, 1991 now abandoned.

FIELD OF THE INVENTION

The invention relates generally to neural networks and, more specifically, to a hybrid neural network composed of both self-organizing and supervised neural networks and concomitant methodologies for operating the hybrid neural network.

BACKGROUND OF THE INVENTION

Many large-scale software systems currently deployed incorporate a database subsystem which stores information such as: customer lists, including names, addresses, and phone numbers; an inventory of equipment; supply houses; lists of parts; or scheduling and routing information. One telephony database system, which is illustrative of an application of the present invention, is a mainframe system which provides on-line support for development, assignment, and maintenance of building location information. Specifically, the building locations are identified by universal codes which uniquely identify buildings that contain telecommunications equipment. Such codes are accessible by the local operating telephone companies, long distance telephone companies, and telecommunications equipment vendors. The building location database presently contains more than one million records for telecommunications building locations in 73,000 cities and for 175,000 buildings. More than 44,000 new buildings are entered into the database each year.

The codes can be entered by any company that has or will be installing telephone equipment in a given building. This leads to a potential problem of duplicate codes being entered into the database. Typically a database user is provided with the capability of checking if the address of a building is already in the database. However, if the address is not entered correctly or exactly as it appears in the database, it may not be found, and a duplicate code would then be created. Each duplicate location code then results in up to tens of thousands of incorrect subsidiary records being generated. Correcting these errors is a time-consuming and costly data purification effort. Oftentimes, the database is never fully corrected, thereby resulting in what is commonly referred to as a "noisy" database.

Conventionally, various computer algorithmic techniques have been employed in an attempt to check on the correctness of an entered building address. However, these techniques have been static in the sense that they have little ability to learn about or adapt to the underlying semantic structure or expressiveness of the database. Also, the algorithms are usually deterministic in the sense that formulae are developed, oftentimes heuristically, assuming that the database conforms to certain underlying parameters and characteristics.

Recently, neural networks have been applied to problem areas or situations related to noise-corrupted data, information retrieval, and data classification. For instance, neural networks have been used to construct many different types of classifiers in such diverse fields as speech recognition and image processing. However, the application of simple neural networks (neural networks of one type only), or even more complex neural networks (combinations of simple neural networks), to the retrieval of information from large databases using textual retrieval keys wherein either the retrieval key or the data in the database is "noisy" has generally proven to be ineffective. For instance, the application of these neural network structures to the problem of identifying and correcting for inadvertent errors in building addresses never achieved the required objective of building address retrieval accuracy of at least eighty percent (80%).

SUMMARY OF THE INVENTION

This deficiency as well as other shortcomings and limitations of conventional neural networks are obviated, in accordance with the present invention, by a hybrid neural network structure which combines a neural network of the self-organized type with a plurality of neural networks of the supervised learning type to successfully retrieve building addresses with the required accuracy.

In accordance with the preferred embodiment of the present invention, the self-organized type is a Kohonen Feature Map Network (KFN) and the supervised learning type is a Back Propagation Network (BPN). As a result of training the KFN, the neural nodes composing the KFN are grouped into a set of output classes. Only one output class, i.e. a set of output nodes, is activated whenever a user request for information, in the form of a first query vector, is supplied to the input of the KFN. There is one BPN for each output class provided by the KFN, and each BPN is independently trained. Upon a user query to the KFN, only one of the BPN's is energized in correspondence to the output class that was activated by the user request. A second query vector serves as input to the activated BPN; this second vector is derived from the same user information utilized to formulate the first query vector. In turn, the second query vector activates the associated BPN to produce the required response to the initial user request for information.

The organization and operation of this invention will be understood from a consideration of the detailed description of the illustrative embodiment, which follows, when taken in conjunction with the accompanying drawing.

DETAILED DESCRIPTION

Overview

Figure 1:
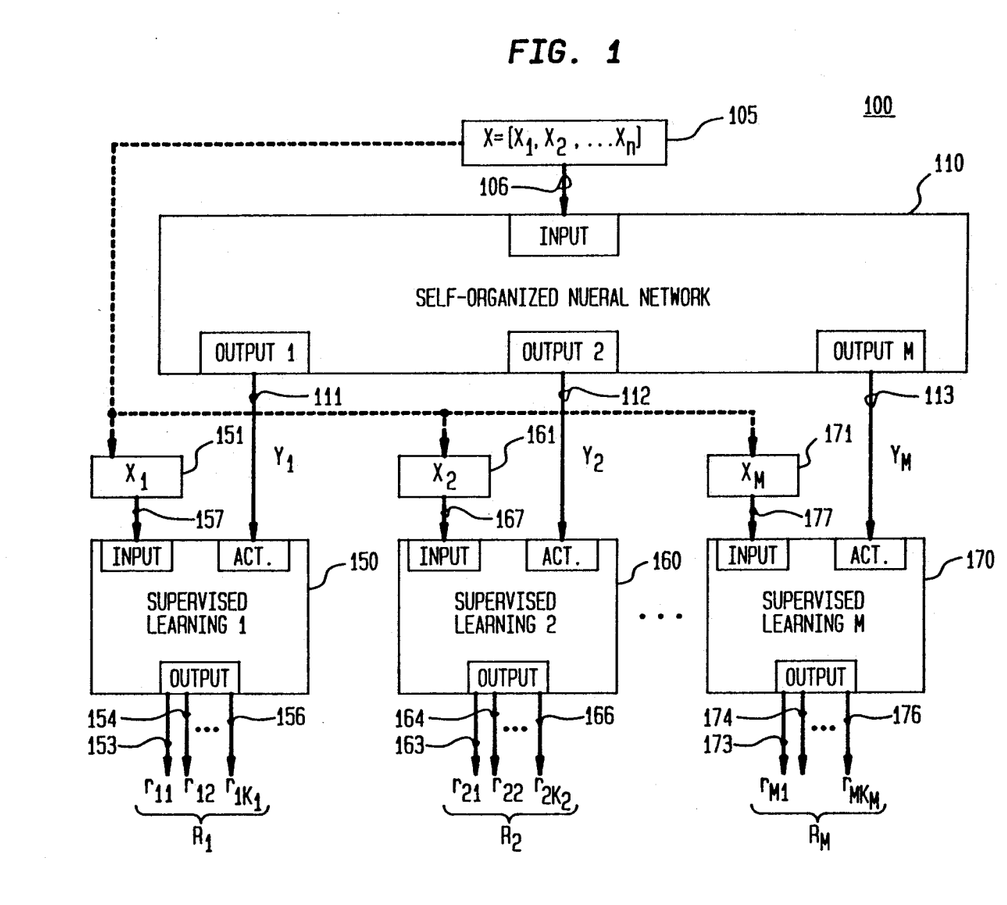
FIG. 1 is an illustrative interconnection diagram of the hybrid neural network in accordance with the present invention.

With reference to FIG. 1, there is shown an illustrative embodiment of hybrid neural network 100 in accordance with the present invention. Network 100 comprises two basic subnetworks, namely, self-organizing neural network 110, and a plurality of supervised neural networks 150, 160, . . . , 170 for processing the output responses of self-organized network 110. In general, the input to network 110 is a N dimensional vector, as represented by X in block 105; X is composed of elements $[x_1 x_2 \ldots x_N]$. There are M outputs from network 110, shown as emanating from network 110 via leads 111, 112, . . . , 113, respectively. The M outputs form an output vector, denoted Y, with elements $[y_1 y_2 \ldots y_M]$; in particular, $y_1$ appears on lead 111, $y_2$ on lead 112, and so forth with $y_m$ appearing on lead 113.

Generally, for each input vector, every output may be activated, that is, each $y_i$ emits a corresponding signal value. Oftentimes, however, network 110 is structured so that only one output lead is activated in response to a given input vector; this is the case considered for the illustrative embodiment in accordance with the present invention. (Other variations will thus be taught to those with skill in the art.) Each output, when it is activated, in turn serves merely to activate its corresponding supervised neural network. The actual input vector to an activated supervised neural network is derived from X; accordingly, the input vector to the $i^{th}$ supervised neural network is designated $X_i$, with $X_1$ being depicted by input block 151, $X_2$ by input block 161, and so forth. For example, if a specific X, say $X^3$, is processed by network 110 and output $y_2$ on lead 112 is activated, then in turn network 160 is activated, and the input vector $X_2$ to network 160, now designated $X_2{}^3$, is derived from the particular $X^3$.

Each supervised neural network 150, 160, or 170 has a plurality of outputs. For instance, network 150 has an output vector, designated $R_1$, of dimension $K_1$, with elements $[r_{11} r_{12} \ldots r_{1K_1}]$ appearing on leads 153, 154, . . . , 156, respectively. Also, network 170 has an output vector $R_M$, of dimension $K_M$, and elements $[r_{M1} r_{M2} \ldots r_{MK_M}]$. The number of outputs for the supervised networks, i.e., the $K_i$'s, are determined from the expected total number of vectors used as inputs to overall network 100. For instance, if K vectors form the set of input vectors X processed by network 110, then the $K_i$'s are constrained by $$K = \sum_{i=1}^{M} K_i.$$

To demonstrate the usefulness of network 100 in certain classifications schemes, an example of the classification of building addresses to insure correct spelling of street names and proper numeric designation is now presented in overview fashion. It is presumed that the network 100 has been trained already. A more detailed discussion, including training methodology, will be presented below after the function theoretic basis is presented in the next section.

It is supposed that system 100 has been arranged and trained on the basis of processing 200 known building addresses; in addition, it is presumed that N=16 and M=5 for this example. Thus, X is a sixteen element vector which, for the example, is formed from the sixteen most frequently used letters in street names, that is, the number part of the building address is ignored (as well as such parts as Road, Street, Avenue). The five outputs $y_i$, $i=1,2,\ldots,5$, have assigned to them 32, 40, 34, 55, and 39, addresses, respectively, as a result of training. Thus, $K_1=32$, $K_2=40, \ldots$, and $K_M=39$. To see how a particular address is classified, one known address embedded in the system, namely, 511 State St., is considered. If the sixteen most frequently used letters include, for example, the following list [a e i o b . . . n r s t], then the particular X corresponding to the address ("511" and "St." are ignored) is [11000 . . . 0011]. This vector is formed by entering 1's in the positions of a,e,s,t—the letters from State in the list—whereas 0's are entered for the letters not present in the street name. Also, even though "t" appears twice, only a single 1 denotes this redundant appearance. It is known (again as a result of training) that the output corresponding to this input vector is $y_2$, so that network 160 is activated. Now the $X_2$ input vector to network 160 must be formulated from the given building address. This is accomplished by including the first twelve characters of the complete building address, now including the numeric designation (but still ignoring Road, etc.), and encoding each character with a six bit representation scheme, similar to an ASCII representation (i.e. 37 alphanumerics—10 numerics, 26 letters, and a space designator—require at least 6 bits for unique representation). The total length of $X_2$ is then 72 bits. The vector for 511 State St. may then be [000101000001 . . . 001111]. When this vector is provided as an input into network 160, it is known that output $r_{22}$ supplies the largest response. Ideally, the response should be a normalized value of 1.0, with all other $r_{2i}$ outputs being 0.0. In practice, the $r_{22}$ output is close to 1.0 (usually $\geq 0.9$) and the other $r_i$ values are close to 0.0 (usually $\leq 0.1$).

It is now supposed that the building address 512 Staate St. is inadvertently input as a vector to network 110. This address results in the same classification as "State" (the 16-bit X vector is the same), so that network 160 would be activated. Then $X_2$ is formulated from the building address 512 Staate and the processing of network 160 is effected. As a result of the error, two output leads may have significant values, say $r_{22}$ and $r_{25}$. A typical diagnostic message would be to have the user check to see if the information presented originally (512 Staate St.) is correct or, more likely, if it should be the address associated with either $r_{22}$ or $r_{25}$ (say $r_{25}$ has been trained to respond to 512 Main St.). Here, after the user reviews the input information 512 Staate St., the conclusion would most likely be that the intended address is 511 State St. It is also possible (but unlikely in this case) that the building address thought to be in error is, in fact, a new address. Then system 100 would have to be restructured and retrained to account for this addition to the database of actual addresses. The result of such a restructuring might mean, for example, that the new building address is assigned to network 160 so that the expected number of inputs is 201 and now $K_2=41$.

Function Theoretic Basis

Representative of the types of neural networks that implement network 110 is a Kohonen Feature Map Network, whereas a Back Propagation Network is illustrative of the types of neural networks that realize supervised networks 150, 160, . . . , 170; both of these illustrative neural networks are discussed in detail below.

Function Theoretic Basis for Kohonen Feature Map Network

Figure 2:
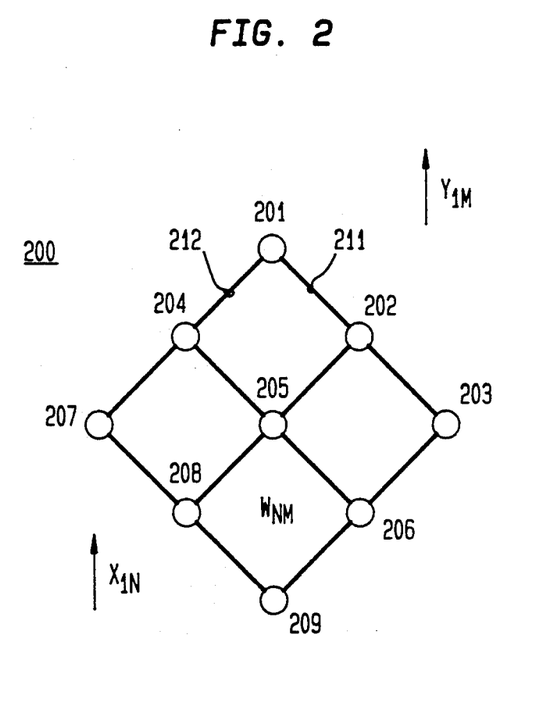
FIG. 2 is illustrative of a fully-connected Kohonen Feature Network having 9 neurodes.

A Kohonen Feature Map Network (KFN) is composed of a set of neural nodes which are fully interconnected as depicted in FIG. 2; KFN 200 processes the incoming signal represented by the input vector X so as to map X (dimension 1×N) to an outout vector Y (dimension 1×M) via a set of vector multiplier weights $W_j$ (dimension N×M), where M is the number of outputs from the KFN. As depicted in FIG. 1, X feeds KFN 110 via bus 106, whereas the M individual elements of Y appear on leads 111, 112, ..., 117, respectively. In mathematical notation, the output vector Y may be represented by the matrix product:

$$Y = XW. \quad (1)$$

If the $i^{th}$ element of X is represented by $x_1$, the $j^{th}$ element of Y is represented by $y_j$, and the term in the $i^{th}$ row and $j^{th}$ column of W is represented by $w_{ij}$, then $$y_j = \sum_{i=1}^{N} x_i w_{ij}. \quad (2)$$

In the case where only one output is activated, the KFN processes the signals at the neural nodes and then selects the node corresponding to the maximum $y_j$, that is, the activated output, designated J, $0 \leq J \leq M$ is the maximum element value:

$$J = \max_j \left( \sum_{i=1}^{N} x_i w_{ij} \right). \quad (3)$$

A KFN may be represented by a square array of M neural nodes ("neurodes"), that is, the array has a side dimension of $M^{\frac{1}{2}}$. Array 200 illustrated in FIG. 2 is of dimension M=9. In FIG. 2, neurodes are labeled as nodes 201, 201, ..., 209, respectively. The neurodes of array 200 are fully connected by interconnection paths, as exemplified by path 211 connecting neurode 201 with neurode 202, and by path 212 connecting neurode 201 with neurode 204. Thus, neurodes 201, ...,209 receive not only the entire input pattern, as supplied by vector X, but also inputs from various other neurodes within the KFN. Moreover, in general, all the neurodes supply components to the output vector Y.

When training the KFN, two considerations must be addressed. First, weight vectors $w_{ij}$ must be properly initialized such that they are normalized to a constant, fixed length (usually 1.0) and that the vectors are randomly distributed. Second, the input vectors of the set used for training also must be normalized to a constant, fixed length (again, usually 1.0). During training, all of the elements $y_j$ of Y are computed for each training vector. Then the maximum element is computed, as per equation (3), and only the maximum plus neighboring neurodes are permitted to be adjusted for the next training iteration. In general, those neurodes that are physically closest to the neurode with the maximum value are its neighbors. One exemplary neighborhood includes the neurodes which are either one row or one column removed from the node with the maximum value. The precise size of the neighborhood may also be a variable during training; the neighborhood may start out as being all rows and columns within a predetermined distance, and this distance is decreased to one row or one column as training moves toward completion.

The rule for adjusting the weight vectors associated with each neurode during training may be expressed as follows:

$$w_{ij}^n = w_{ij}^o + \alpha(x_i^n - w_{ij}^o), \quad (4)$$

where the superscripts "o" and "n" represent the old and new values of the components and $\alpha$ is a learning constant.

To form the input vector X for the illustrative case of locating building addresses, a vector composed of 0's and 1's is constructed from the letters forming the street name. The sixteen most frequently used letters in the street name (excluding numerics and common terms such as Road, Street, etc.) are expressed by the list [a e i o b c d g h k l m n r s t]. The 0-1 X vector is formed by mapping the letters in the street name to element positions in the vector of letters, that is, by inserting a 1 in the vector position corresponding to a letter whenever that letter is present in the street name; otherwise, 0 is inserted in the vector position. For instance, State may be represented by the vector [1100000000000011].

To train KFN 110, network 110 is afforded the opportunity to self-organize on the basis of the expected number of building addresses which will serve as input to KFN 110. For instance, in a location with 200 building addresses, then these 200 error-free addresses are used for training. If KFN 110 is a 3×3 neurode network as exemplified by FIG. 2, the following parameters may be used to train: the weight vectors are initialized with an initial distribution of weights of width 0.012 to point in a random direction around a 16-dimensional hypersphere; $\alpha = 0.05$; and the neighborhood is one row and one column. The width of 0.012 signifies that the weights are initially distributed between ±0.012. The value for $\alpha$ is the initial learning rate, and this rate is reduced by a factor proportional to the number of training iterations. With these parameters, it generally takes 30 epochs for training, that is, the 200 addresses serve as input 30 times each for a total of 6000 training iterations. Thus, on the final training iteration, the learning rate is $\alpha/6000$.

Figure 3:
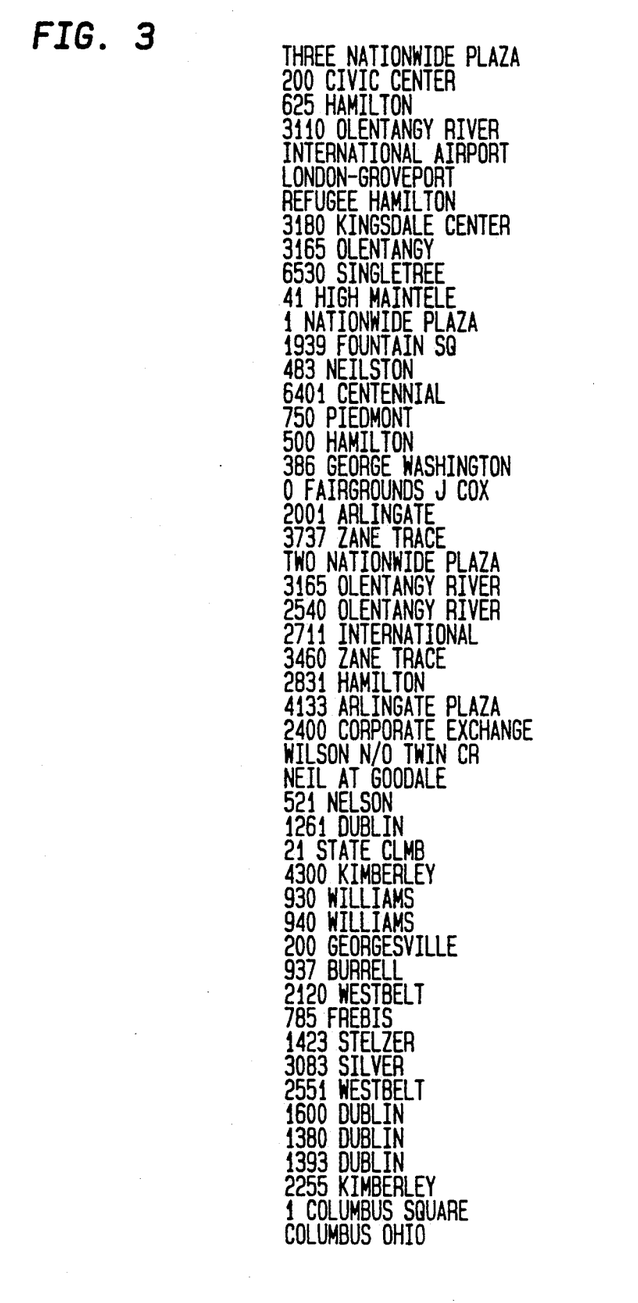
FIG. 3 is a representative sample of actual addresses used to train the Kohonen Feature Network.
Figure 4:
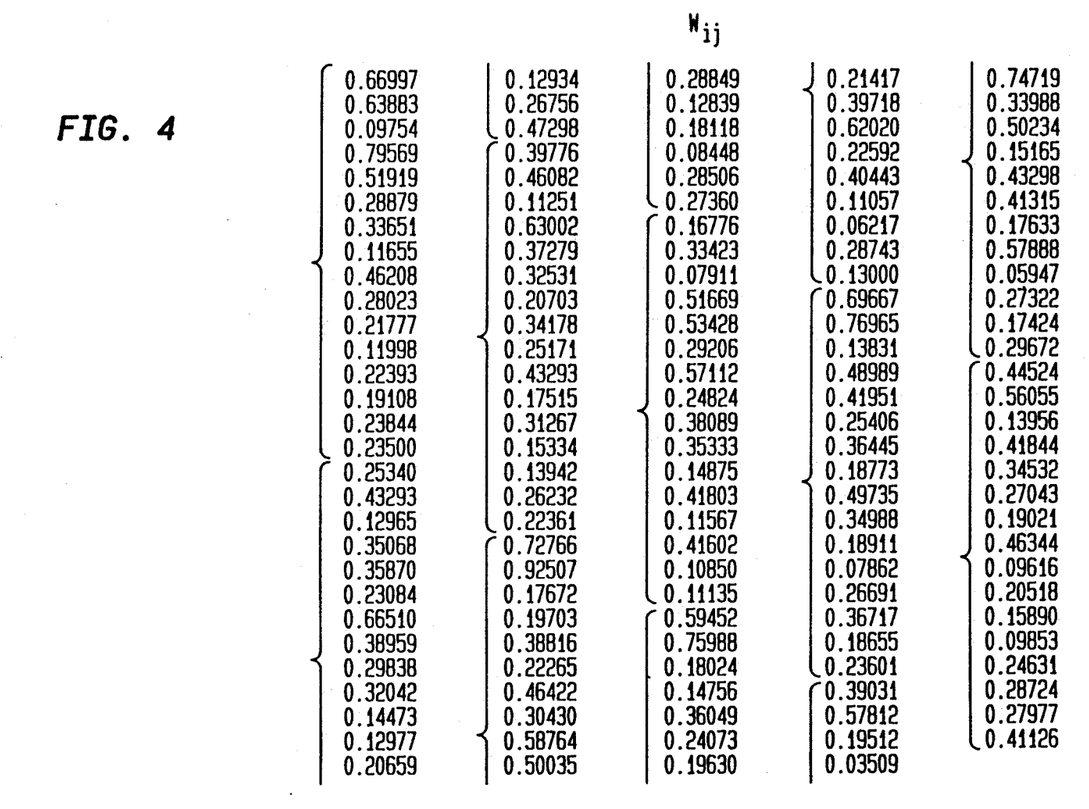
FIG. 4 lists the set of weights resulting from training the Kohonen Feature Network with 200 actual addresses as exemplified by the addresses of FIG. 3.

The street addresses shown in FIG. 3 are sampling of the addresses used to train Kohonen Feature Network 110. (It should be recalled that only the alphabetic part, not the numeric part, of an address is retained; e.g., only Civic Center in "220 Civic Center" is retained. Also, preprocessing removes the term "Three" in an address such as "Three Nationwide Plaz" to arrive at Nationwide Plaz as the input.) The 144 actual weights for a training set of 200 actual vectors are shown in FIG. 4 the nine output classes (recall there are N×M=16×9=144 total weights).

The training of the KFN may be actually an automated process. Various vendors have supplied software design packages which can compute the weights given a set of training vectors; the packages allow user control over various training parameters such as the width, the initial and final neighborhoods, the initial distribution of weights, and so forth. One representative package, called the ANSim (TM) system, is supplied by the Science Applications International Corporation of San Diego, Calif., and was actually utilized to generated the weights set forth in FIG. 4. The parameters listed above served as input to the ANSim package.

Generally, there are nine possible output vectors from the 3×3 KFN, that is, each of the 200 addresses will activate one of the $y_i$'s. For instance, the nine neurodes generated to 32, 14, 21, 16, 4, 18, 40, 21, and 34 addresses, respectively. However, to reduce the number of Back Propagation Networks which connect to KFN 110, it is possible to group outputs into a smaller number of classes and yet still achieve the desired retrieval rate. As an example, it is supposed that each of the 200 building addresses is assigned to one of five classes based upon the neurode activated in KFN 110. Classes 1, 2, 3, 4, and 5 are then assigned the building addresses that activate, respectively: neurode 201; neurode 207; neurodes 202, 204, 205, and 208; neurode 209; and neurodes 203 and 206. Thus, classes 1-5 have assigned 32, 40, 34, 55, and 39 addresses, respectively.

Function Theoretic Basis for Back Propagation Network

Figure 5:
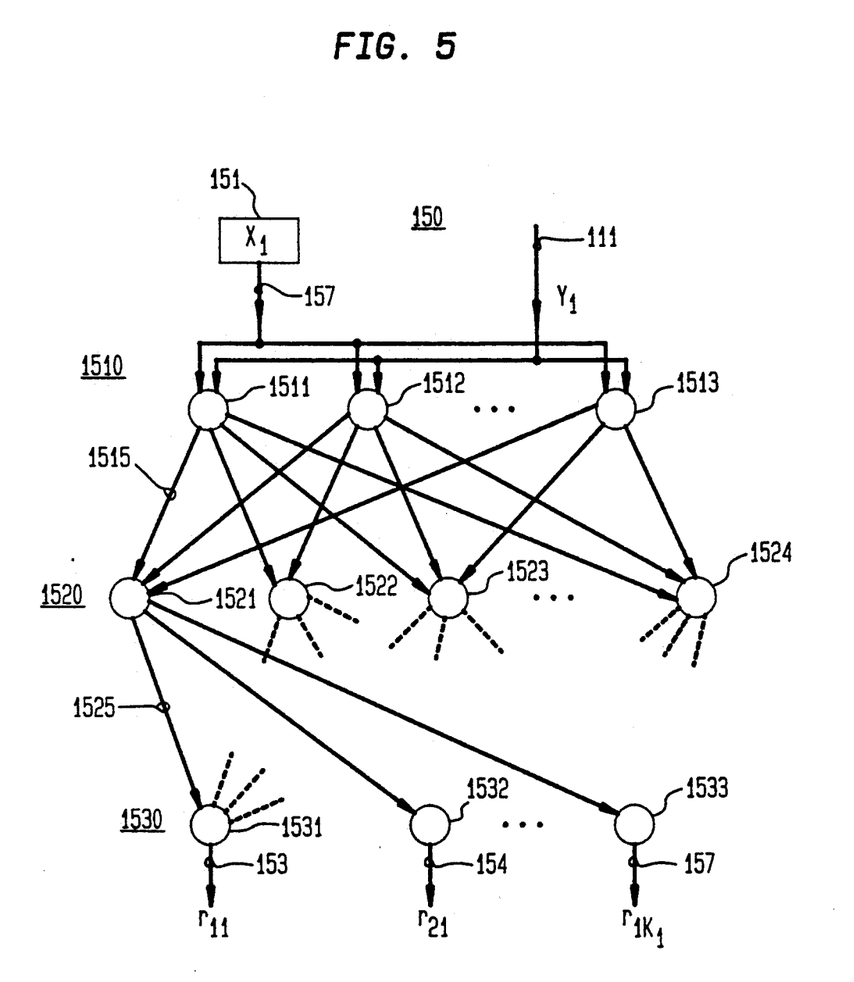
FIG. 5 is illustrative of a Back Propagation Network having input, output and hidden layers.

A Back Propagation Network (BFN) is composed of a set of neural nodes interconnected as depicted in FIG. 5, which is exemplary of each network 150-170 of FIG. 1 (say network 150 for discussion purposes). Back Propagation Networks as a class are supervised in the sense that they require the network to be provided with the correct response during training, as discussed in more detail shortly.

Network 150 is a multilayered, fully-connected, feedforward network composed of input layer 1510, output layer 1530, and hidden layer 1520. Input layer 1510 includes neural nodes 1511-1513, output layer 1530 is composed of nodes 1531-1534, and hidden layer 1520 includes nodes 1521-1524. Each node 1511-1513 in input layer 1510 connects to every node 1521-1524 in hidden layer 1520. Similarly, each node 1531-1533 in output layer 1530 is connected to every node in the hidden layer. Signal path 1515 is exemplary of the connection between nodes 1511 and node 1521, whereas signal path 1525 depicts a connection between nodes 1521 and 1531. Each hidden layer node, of which node 1521 is representative, receives and processes signals received from all input nodes 1511-1513 over corresponding signal paths; the interconnecting signal paths such as path 1515 weight or multiply the signal emanating from the input nodes. Similarly, each output layer node, of which node 1531 is representative, receives and processes signals received from all hidden nodes 1521-1524 over associated signal paths; the interconnecting signal paths such as path 1525 weight or multiply the signal emanating from the hidden nodes.

In accordance with the illustrative embodiment of the present invention, Back Propagation Network 150 is composed of 72 input nodes, $K_1$ output nodes, and 1.5 $K_1$ (rounded to the closest integer) hidden nodes. Each node 1511-1513 in input layer 1510 services two inputs, namely, activation signal $y_1$ on lead 111 and a corresponding element from input vector $X_1$ on path 157. Signal $y_1$ enables nodes 1511-1513 to receive $X_1$. Each output layer node 1531-1533 provides a corresponding output activation, namely, node 1531 delivers the activation level $r_{11}$ on lead 153, node 1532 supplies $r_{12}$ on lead 154, and so forth, where the output vector $R_1$ has elements $[r_{11}\ r_{12} \ldots r_{1K_1}]$.

Each node in either the hidden layer or the output layer is arranged to process the arriving signal set and generate a corresponding activation signal having a signal strength given by:

$$a_i = \frac{0.5(1 - e^{-t_i})}{1 + e^{-t_i}}, \qquad (5)$$

where $$t_i = \theta_i + \sum_{i=1}^{N} n_i z_{ij}, \qquad (6)$$

$\theta_i$ is the bias for the $i^{th}$ node, $n_i$ is the signal emitted by the $i^{th}$ node, and $z_{ij}$ is the weight to node i from node j. Each bias is learned in the same manner that weights are learned. As evaluated by equation (5), nodal activations are in the range from −0.5 to 0.5 because networks learn more rapidly when the network is scaled for this range. Moreover, if the training set has output vectors outside this range, a Back Propagation network can never reproduce the desired output vectors without error. (Equation (5) is called the sigmoid representation of the transformation of the signal levels from one layer to the next layer. Other transformations are possible, such as a linear transformation; these transformations are known to those skilled in the art.)

As alluded to above, to train a Back Propagation network, the outputs (e.g., $r_{11}$, $r_{1K_1}$) are compared with the inputs $X_1$ from the training set. The interconnection weights $z_{ij}$ are selected so that the total error over the set of training vectors is minimized. Training is based upon the so-called Generalized Delta Rule (GDR)—errors are evaluated from the differences between the input and output vectors—and the weights are modified in relation to the error difference as processed by the GDR. Thus, the Back Propagation network learns a mapping relation by repeatedly and iteratively evaluating vectors from the training set and adjusting the weights to minimize the total error. Each iteration through a set of training vectors is called a cycle.

The correction factor applied to the weights $z_{ij}$ at the end of a cycle is expressed by:

$$\Delta z_{ij}^n = \nu(\delta_i a_j) + \beta z_{ij}^o, \qquad (7)$$

where the superscripts "o" and "n" represent the old and new values, $\nu$ is the learning rate, $\beta$ is the momentum, and $\delta_i a_j$ is the current weight change dictated by the GDR. The learning rate proportions the dictated weight change to cause the error to generally decrease over the training set. The momentum determines what portion of the previous weight changes will be added to the current weight changes. The current weight change is determined from the total error relation;

$$\text{Error} = \sum_{V_1} \sum_{i=K_1} (p_i - a_i)^2, \qquad (8)$$

where $V_1$ is the number of vectors in the training set, and $p_i$'s are the expected elements in each output vector.

This theoretical basis in now applied to the specific situation of detecting errors in building addresses. Certain of the networks 150-170 of FIG. 1 are trained with one type (Type I) of training, whereas the remainder are trained with a second type (Type II) of training. The particular type of training depends on the characteristics of the addresses grouped into the output classes from KFN 110. For instance, Type II is used for highly correlated address classes, whereas Type I is used for somewhat less correlation. One measure to select Type II training over Type I training is to use Type II training when more than 50% of the actual addresses have the same street name.

Figure 6:
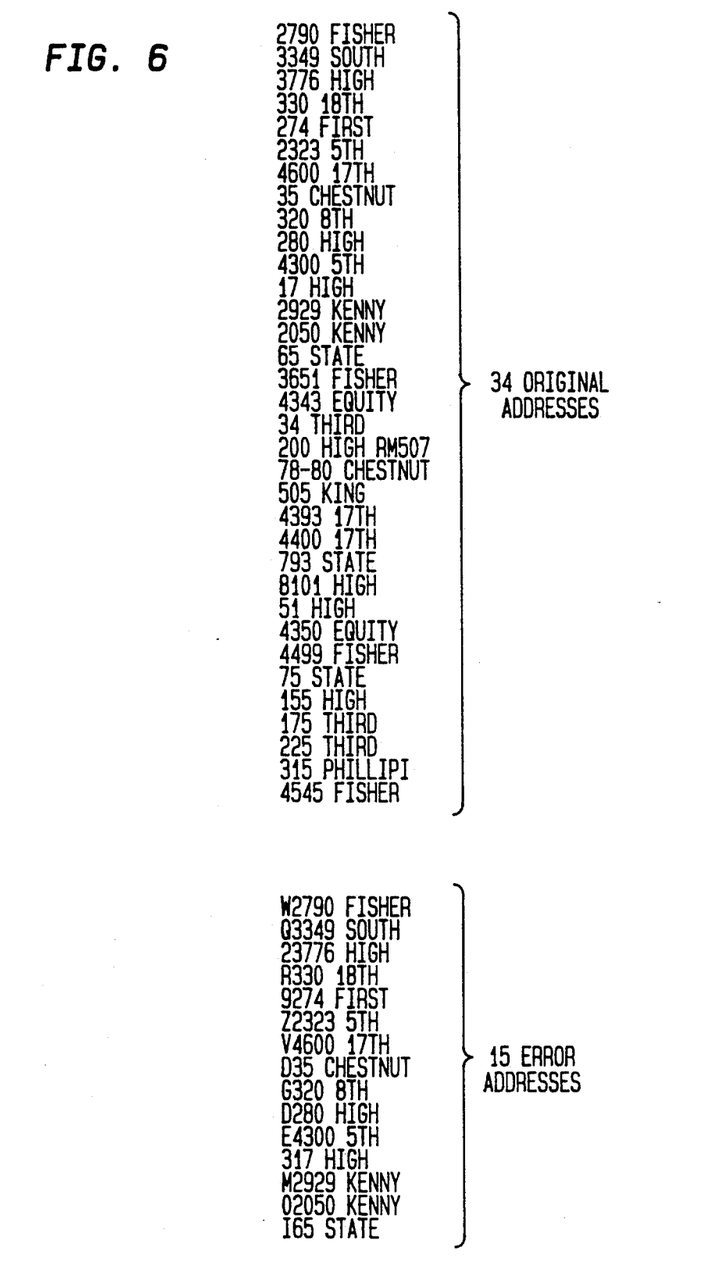
FIG. 6 is a list of addresses for training a Back Propagation Network with Type I training.
Figure 7:
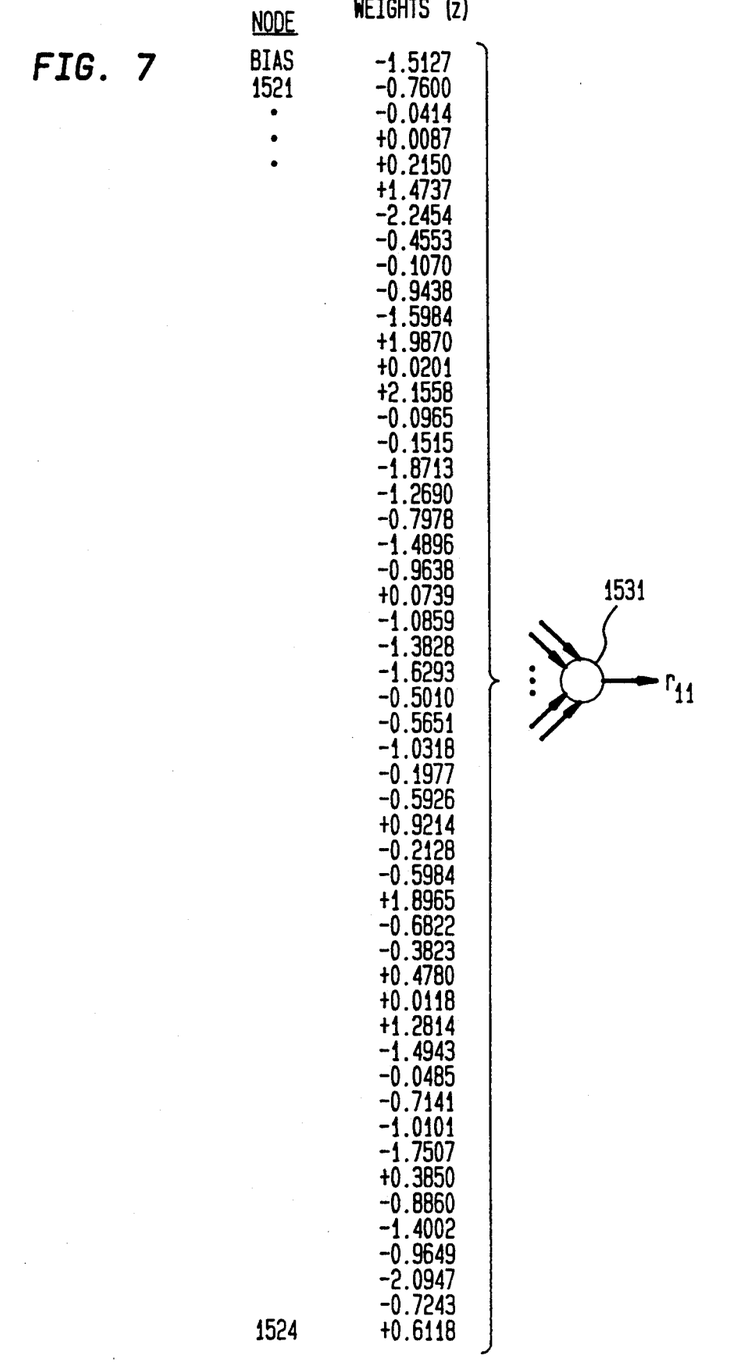
FIG. 7 is a partial list of weights for a Back Propagation Network trained with the addresses of FIG. 6.

The Type I training set contains both error-free addresses and two sets of vectors with an error for each building address. The first error vector may be developed by deleting the first character of the address; the second error vector may be developed by inserting a random alphanumeric character at the beginning of the address. These errors represent single character-shift variations for a building address. The listing of FIG. 6 shows a training set of 34 vectors for the class having $K_3=34$ vectors, i.e., the class having neurodes 202, 204, 205, and 208 grouped as a class. The hidden layer is composed of fifty nodes. Also shown in the listing of FIG. 6 are 15 vectors formed from the first 15 vectors of the training set by inserting a random character at the beginning of each address. FIG. 7 depicts some of the weights for the trained network. The weights are for all those signal paths terminating on the first output node 1531 of FIG. 5.

Figure 8:
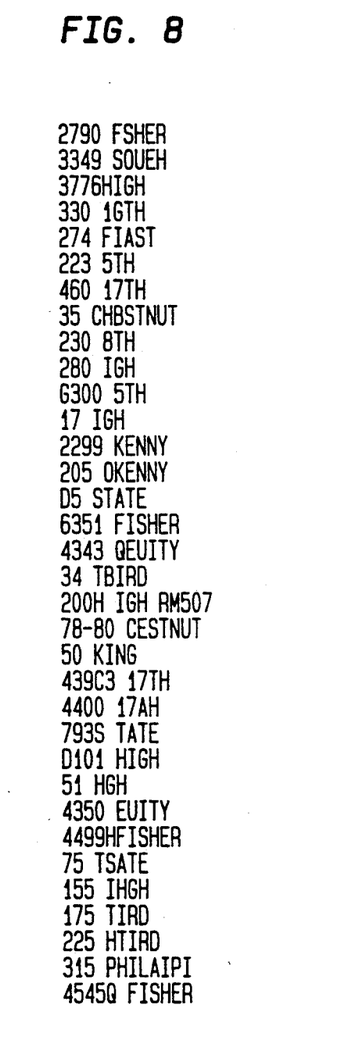
FIG. 8 is a list of addresses for training a Back Propagation Network with Type II training.
Figure 9:
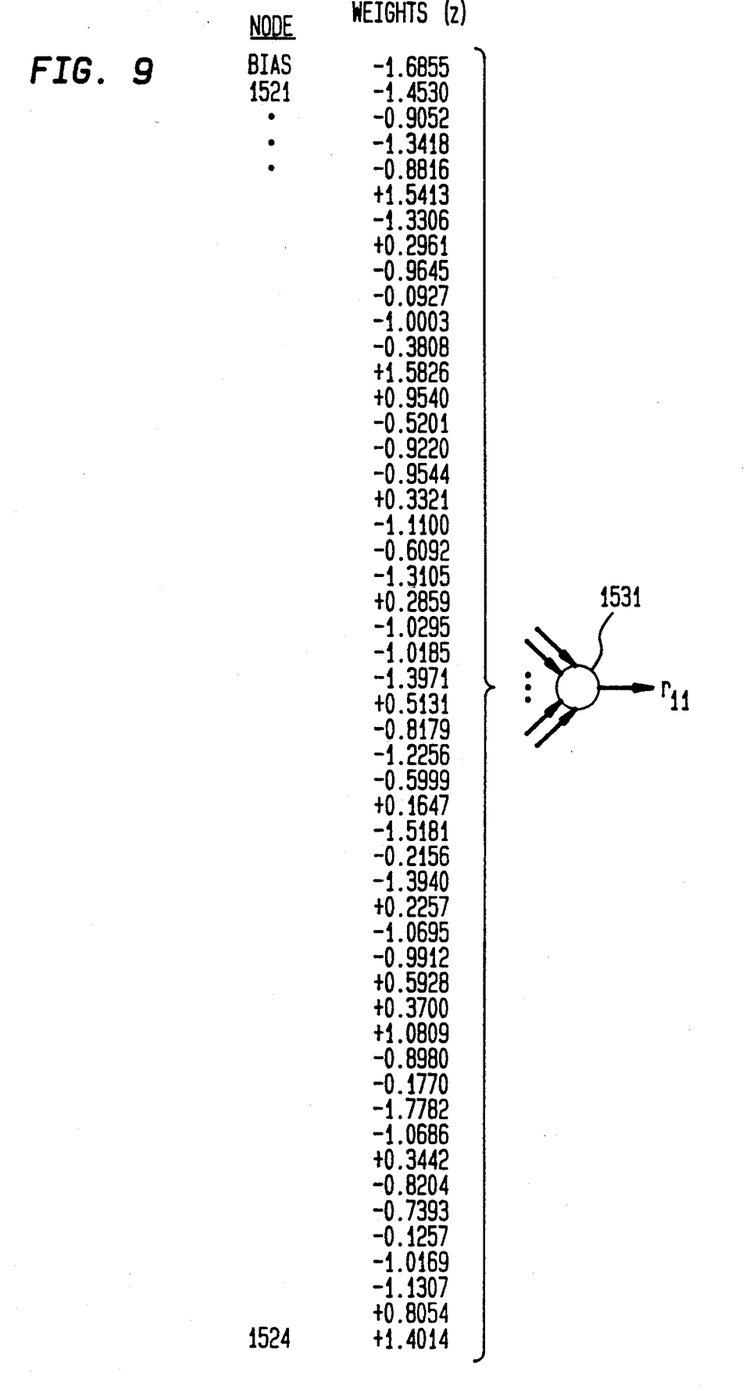
FIG. 9 is a partial list of weights for a Back Propagation Network trained with the addresses of FIG. 8.

Now the same Back Propagation Network, i.e., $K_3=34$, is trained as a Type II network for comparison purposes. The Type II training set contains 544 (16 sets of 34) building addresses with random errors. The training set may be developed by: randomly deleting a single alphanumeric character; randomly replacing a single character with a random character; randomly transposing two adjacent characters; and randomly inserting a random character. These errors represent the bulk of the typographical errors. The listing of FIG. 8 depicts the first set of the 16 sets of 34 addresses with random errors. FIG. 9 depicts some of the weights for the trained network. Again the weights are for all those signal paths terminating on node 1531 of FIG. 5.

For the exemplary case of 200 building addresses, classes 1, 2 and 5 were trained with Type I data, whereas classes 3 and 4 were trained with Type II data because of the characteristics of the particular building addresses selected for the illustrative case. With the training for KFN 110 and five Back Propagation Networks 150, 160, . . . , 170 as explicity set forth in the foregoing, the average retrieval accuracy is 93%.

The training of the Back Propagation Network may be actually an automated process. Various vendors have supplied software design packages which can compute the weights given a set of training vectors; the packages allow user control over various training parameters such as the bias, momentum, the initial distribution of weights, and so forth. One representative package, called the Neural Works Professional II/Plus, is supplied by the Neural Ware, Inc. Applications International Corporation of Pittsburgh, Pa., and was actually utilized to generated the weights set forth in FIGS. 7 and 9.

It is to be understood that the above-described embodiment is simply illustrative of the application of the principles in accordance with the present invention. Other embodiments may be readily devised by those skilled in the art which may embody the principles in spirit and scope. Thus, it is to be further understood that the methodology described herein is not limited to the specific forms shown by way of illustration, but may assume other embodiments limited only by the scope of the appended claims.

What is claimed is:

1. A neural network for retrieving information from a database, the neural network being trained to retrieve the contents of the database in response to a user input, the neural network comprising:

input means for receiving the user input and converting the user input to produce a first user query, a self-organized neural network composed of neural nodes, said neural nodes being grouped into classes based on node activation resulting from training said self-organized neural network with reference to the contents of the database, said self-organized neural network including a plurality of outputs in correspondence to the number of classes, said first user query serving as an input to each of said neural nodes, said self-organized neural network being responsive to said first user query so that one of said classes and, correspondingly, one of said outputs is activated as the result of the user input, query means for receiving the user input and transforming the user input to produce a second user query different from but related to said first user query, and a plurality of independently trained supervised learning networks, responsive to said query means and said self-organized neural network such that each of said outputs serves as an input to a corresponding one of said supervised learning networks, said learning networks being trained with reference to the contents of the database and arranged such that only one of said learning networks is activated in correspondence to said activation of said one of said classes, said activated one of said learning networks processing said second user query and emitting the retrieved information in response to the user input.

2. The network as recited in claim 1 wherein said self-organized neural network is a Kohonen Feature Map Network and each of said supervised learning networks is a Back Propagation Network.

3. The network as recited in claim 2 wherein the contents are building addresses and a subset of said Back Propagation Networks is trained with data formed from single character-shift variations in the contents supplied for training, said subset corresponding to the number of said classes indicative of said character-shift variations.

4. The network as recited in claim 2 wherein the contents are building addresses and a subset of said Back Propagation Networks is trained with data formed from random errors in the contents supplied for training, said subset corresponding to the number of said classes indicative of said random errors.

5. The network as recited in claim 2 wherein the contents are building addresses and a subset of said Back Propagation Networks are trained with data formed from single character-shift variations in the contents supplied for training, and the remainder of said Back Propagation Networks are trained with data formed from random errors in the contents supplied for training, said subset corresponding to the number of said classes indicative of said character-shift variations.

6. The network as recited in claim 2 wherein the contents are building addresses and said Kohonen Feature Map is trained with a subset of the contents of the database, said subset provided by the user to satisfy training criteria.

7. A neural network for retrieving information from a database, the neural network being trained to retrieve the contents of the database in response to a user query, the neural network comprising means for formulating a first query and a second query based upon the user query, a self-organized neural network, responsive to said means for formulating, composed of neural nodes and a plurality of outputs, said neural nodes being grouped into classes based on node activation resulting from training said self-organized neural network with reference to the contents of the database, wherein said first query serves as an input to each of said neural nodes and one of said classes is activated and, correspondingly, one of said outputs is activated as the result of said first query, and a plurality of independently trained supervised learning networks, responsive to said means for formulating and said self-organized neural network such that each of said outputs serves as an input to a corresponding one of said supervised learning networks, said supervised learning networks being trained with reference to the contents of the database and arranged such that only one of said supervised learning networks is activated in correspondence to said activation of said one of said outputs, said activated one of said supervised learning networks processing said second query and emitting the retrieved information in response to said second query.

8. The network as recited in claim 7 wherein said self-organized neural network is a Kohonen Feature Map Network and each of said supervised learning networks is a Back Propagation Network.

9. The network as recited in claim 8 wherein the contents are building addresses and a subset of said Back Propagation Networks is trained with data formed from single character-shift variations in the contents supplied for training, said subset corresponding to the number of said classes indicative of said character-shift variations.

10. The network as recited in claim 8 wherein the contents are building addresses and a subset of said Back Propagation Networks is trained with data formed from random errors in the contents supplied for training, said subset corresponding to the number of said classes indicative of said random errors.

11. The network as recited in claim 8 wherein the contents are building addresses and a subset of said Back Propagation Networks are trained with data formed from single character-shift variations in the contents supplied for training, and the remainder of said Back Propagation Networks are trained with data formed from random errors in the contents supplied for training, said subset corresponding to the number of said classes indicative of said character-shift variations.

12. The network as recited in claim 8 wherein the contents are building addresses and said Kohonen Feature Map is trained with a subset of the contents of the database, said subset provided by the user to satisfy training criteria.

13. The network as recited in claim 7 wherein the user query contains alphanumeric information and wherein said means for formulating includes first means for selecting alphabetic data from the user query and second means for selecting alphanumeric data from the user query.

14. A method for retrieving information from a neural network, the neural network being trained to retrieve the contents of a database in response to a user query, the method comprising the steps of implementing a self-organized neural network composed of neural nodes interconnected in a preselected pattern, training said self-organized neural network with reference to the contents of the database, grouping said neural nodes into classes based on node activation resulting from said training, formulating a first query and a second query from the user query, submitting said first query to each of said neural nodes and activating one of said classes based on the results of the first query, implementing a plurality of supervised learning networks, one for each of said classes, independently training each of said plurality of learning networks with reference to the contents of the database, activating only one of said learning networks in correspondence to said activation of said one of said classes, submitting said second query to said activated one of said learning networks, and emitting the retrieved information in correspondence to an output of said activated one of said learning networks in response to said second query.

* * * * *